Figure 1:
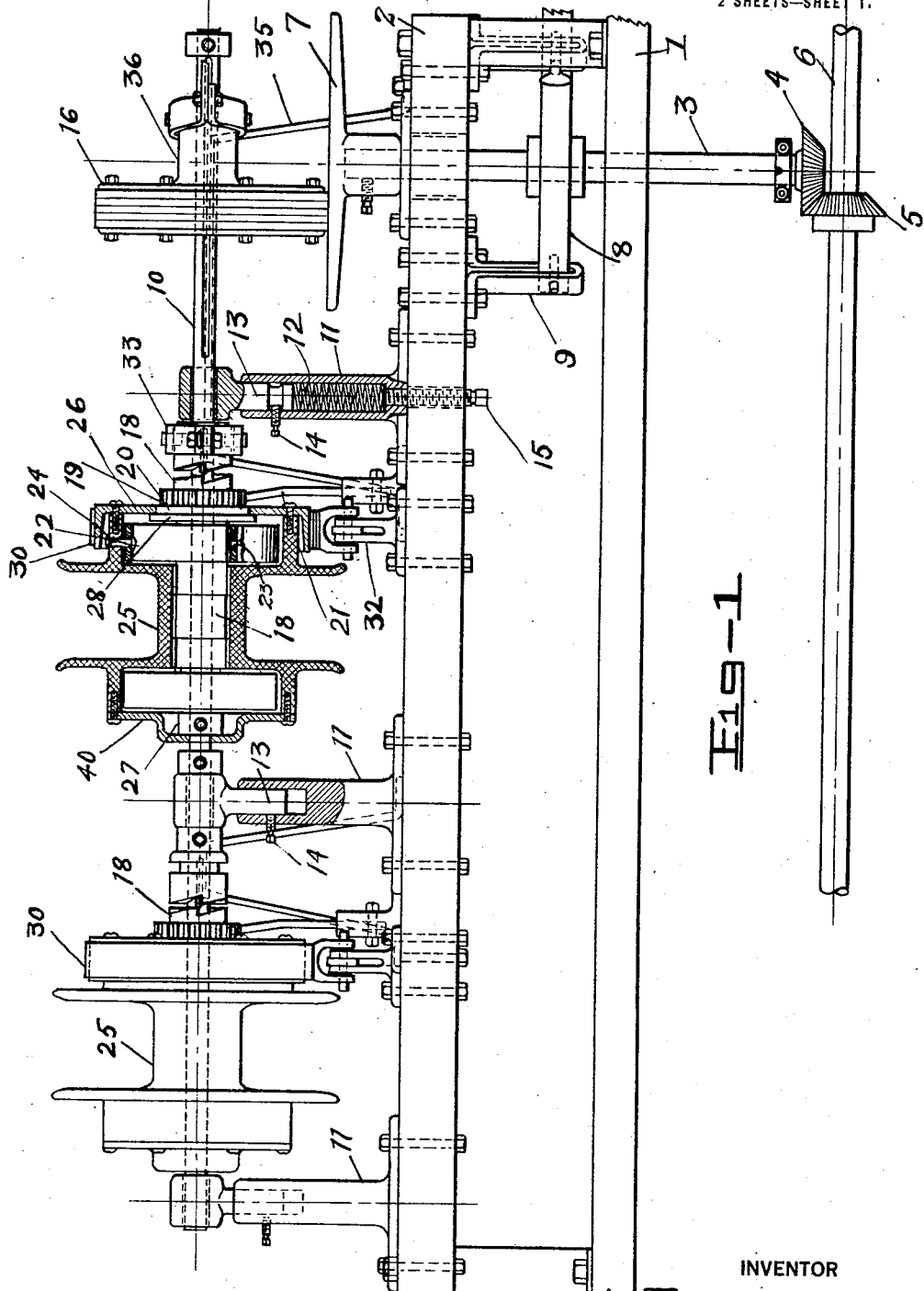

T. J. TREW.
AUTOMATIC REELING DEVICE FOR TROLLING LINES.
APPLICATION FILED MAR. 29, 1918. RENEWED OCT. 29, 1919.

1,324,703.
Patented Dec. 9, 1919.
2 SHEETS—SHEET 1.

INVENTOR
Thomas J. Trew.
BY
ATTORNEY

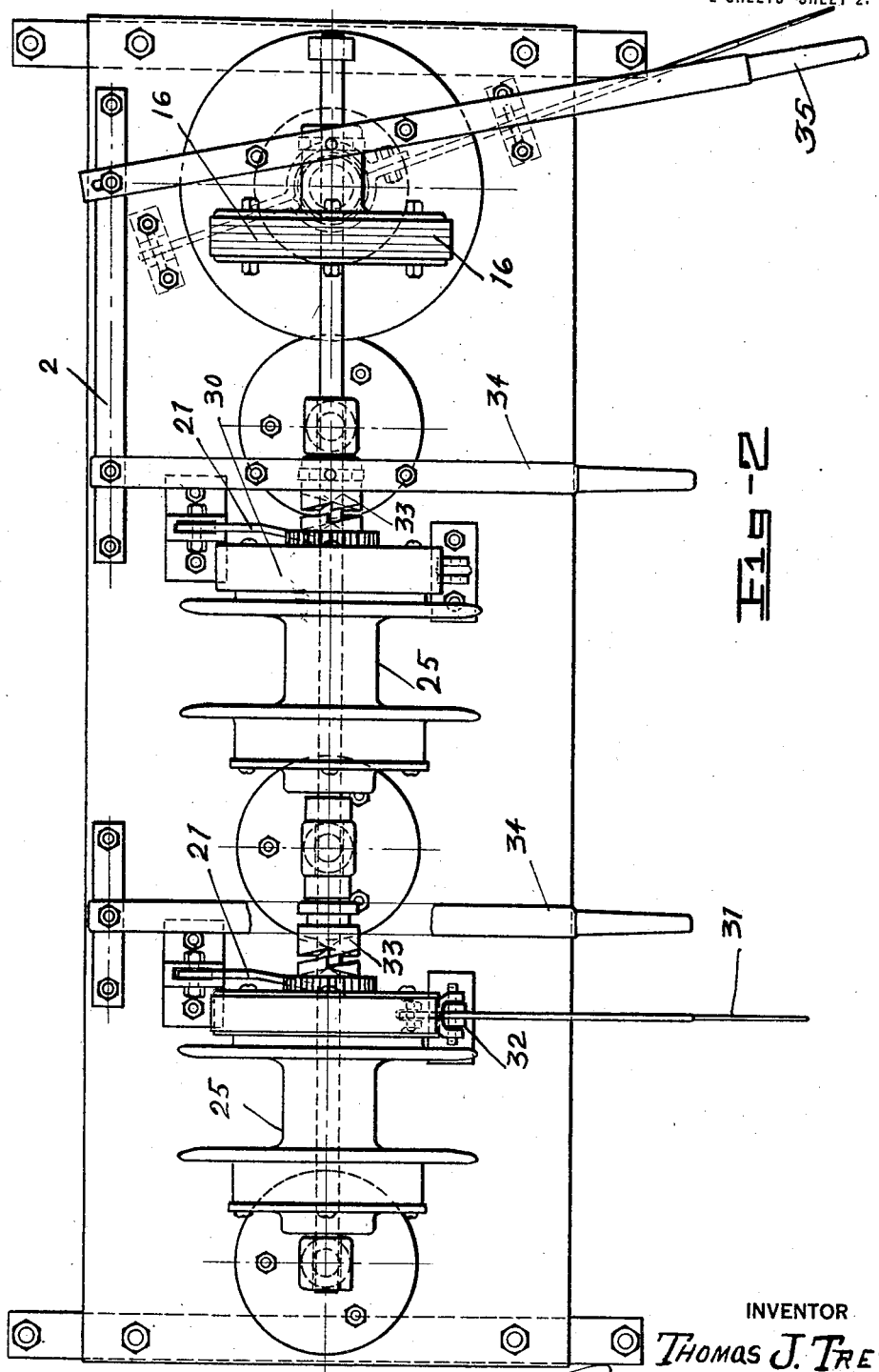

UNITED STATES PATENT OFFICE.

THOMAS J. TREW, OF SEATTLE, WASHINGTON, ASSIGNOR TO KING AUTOMATIC TROLLING CO., OF SEATTLE, WASHINGTON.

AUTOMATIC REELING DEVICE FOR TROLLING-LINES.

1,324,703.  Specification of Letters Patent.  Patented Dec. 9, 1919.

Application filed March 29, 1918, Serial No. 225,593. Renewed October 29, 1919. Serial No. 334,373.

*To all whom it may concern:*

Be it known that I, THOMAS J. TREW, a citizen of the United States, residing at Seattle, in the county of King and State of Washington, have invented a new and useful Improvement in Automatic Reeling Devices for Trolling-Lines, of which the following is a specification.

This invention relates to improvements in automatic reeling devices for trolling lines, and more particularly to power actuated reeling devices applicable to motor driven fishing boats.

On the Pacific coast from California to the Alaskan Peninsula, trolling for salmon has long been recognized by commercial fishermen as a successful method of capturing certain species of this fish. With the development of the internal combustion engine it has received its greatest impetus for it is not uncommon to see a fisherman operate two or more trolling lines from a slowly moving motor boat. These fish vary in size and weight from ten to sixty pounds and during the height of the run it becomes an endurance test on the part of the fisherman to be continuously pulling in these, the gamest of all sea fish. At the present time the only method of handling the trolling line is by hand. Not only is this method extremely fatiguing and antiquated in comparison to the rapid progress in other fields of the fishing industry, but it is obviously both slow in letting out and recovering the line when the fish strikes, and hence the fisherman is frequently unsuccessful in hooking and recovering the fish. Should the line be unyielding when the fish strikes, the hook snags out, or if the line is not quickly recovered during a rush, a slackness therein permits the fish to shake the hook out of its mouth. It is further obvious that when sixty or more fathoms of line is pulled in upon the deck of the boat, it gets tangled and requires much time to untangle and be returned to the water. There also must be exercised care in feeding the wet line out by the hand or the fingers will be cut severely.

The object of my invention is to provide one or a plurality of automatic reeling devices for trolling lines that can be mounted upon the stern of a fishing motor boat and having communicating means with the propeller shaft for effecting its actuation.

A further object resides in the provision of a variable speed transmission for reeling in the trolling line.

A still further object resides in the provision of a spring actuated reel that imparts a yielding tension to the line at all times, whereby, when the fish strikes, it yields sufficiently to set the hook in the mouth of the fish without tearing the cartilage. The spring actuated reel likewise instantly recovers the line as the run takes place, and thus no slackness is permitted therein to afford an opportunity for the fish to shake the hook out of its mouth. The line is thence reeled in by the variable speed transmission, and the fish recovered from an untangled line.

A still further object resides in the manner of feeding the line back into the water under a friction control.

The invention consists in the arrangement, construction and combination of parts, as will be more fully described in the following specification, illustrated in the accompanying drawings and finally pointed out in the appended claims.

In the drawings, Figure 1 is a side elevation in part section of my automatic reeling device and associated mechanism, and Fig. 2 is a plan view of the same.

Referring now to the drawings, wherein are employed like reference numerals to indicate like parts in all of the figures, the numeral 1 represents the rear top deck of a fishing boat and upon this deck is mounted a frame structure 2 upon which the automatic reeling devices and associated mechanism are supported. 3 is a shaft rotatably suspended from the frame 2 and being provided with a cog gear 4 upon its lower end, adapted to mesh with a similar cog gear 5 provided on the propeller shaft 6 conveniently located thereupon rearwardly of the engine (not shown). Upon the upper end of the shaft 3 is provided a friction disk 7, and 8 is a lever pivotally attached to a suspension bracket 9 of the frame 2 and having contact with the shaft 3 whereby the shaft 3 can be caused to be disengaged from its intermeshing contact with the propeller shaft 6 when rotation thereof is not desired.

10 is a shaft extending transversely the rear deck of a motor boat and is adapted to be yieldingly mounted upon a plurality of upright members 11 placed lengthwise of the frame structure 2.

I have herein shown a well known form of construction for accomplishing this result, consisting—namely, in the provision of compression springs 12, disposed within the hollow upright members 11, which form a cushion support for the lower end of the plungers 13. These plungers are journaled upon their upper ends to support the rotatable shaft 10. 14 are set screws adapted to secure the plungers 13 within the members 11 in any predetermined longitudinal position, and 15 are similar set screws having contact with the lower end of the compression springs 12 for adjusting the tension thereof.

16 is a friction wheel keyed for longitudinal movement upon the shaft 10, and this wheel is adapted to frictionally engage the disk 7. Disposed upon the shaft 10 are the automatic reels, of which there may be one or more. These reels comprise a hub 18, that is adapted for axial rotation upon the shaft 10. 19 is an integrally formed collar upon said hub and has provided around its outer periphery a series of notches for the reception of a dog engaging element 21, and this dog engaging element is adapted to be pivotally attached to the frame 2 and can be manually thrown into or out of contact with the collar 19 and thereby lock the hub 18 against independent rotary movement upon the shaft 10.

22 are torsion springs provided upon said hub, one end thereof being bent downwardly and provided with a slot in the end thereof for the reception of a lug 23 provided on the periphery of said hub. This provision enables the ends to disengage from the lugs when the springs are unwound, and thereby precludes breaking by back lashing; the other ends of said springs being fixedly attached to the lateral extension flange 24 of the rotatably mounted yoke shaped reel 25 disposed intermediate said springs. Fixedly attached to the lateral extension flange 24, or formed integral therewith, is the end plate 26 which is adapted to come in contact centrally thereof with a shoulder 20 provided upon the collar 19 and thus serves as an end bearing for the reel 25 in its rotary movement upon the hub 18. 27 is a fixedly secured collar upon the shaft 10 and is disposed intermediate the opposite end plate 40 of the reel and the spring 21, and 28 is an inward extension of the collar 20 of increased diameter and the function of the fixedly formed collar 27 and the inward extension 28 being to prevent longitudinal displacement of the reel in its bearing contact with the central hub portion 18 preferably of increased diameter.

30 is a brake band provided around the periphery of the laterally disposed end plate 26 and this brake band is actuated by a lever 31 connected thereto and pivotally attached to an upwardly projecting bracket 32 of the frame.

33 is a jaw tooth clutch keyed for longitudinal movement upon the shaft 10 and is adapted to engage the clutch engaging element provided upon the end of the hub 18 and this clutch 33 is provided with a lever 34 similarly mounted upon the frame 2 for urging the clutch into engagement with the hub 18 of the reel.

35 is a similarly mounted lever that is adapted to have a gripping contact with the hub 36 of the friction wheel 16 whereby this friction wheel can be manually shifted to frictionally engage the peripheral surfaces of the disk 7 in any position and thereby establish a variable speed transmission for actuating the reel.

The operation of the automatic reeling device may be described as follows: We will assume the fisherman has reached the trolling waters, and desires to feed the trolling line (not shown) which is spooled upon the yoke portion of the reel, into the water; the dog engaging element 21 is thrown out of contact with the hub, the sinker upon the end of the line is thrown overboard, and the inertia of the water through which the line is drawn by the moving boat, causes the reel to unwind. The speed at which the reel unwinds being controlled by the lever 34 which actuates the friction brake band 30.

It is obvious, as the reel unwinds, the torsion springs are wound into compression upon the hub 18 which is held against further reverse rotary movement by throwing in the dog engaging element 21. The tension of the spring, when wound into compression, is adjusted to equalize approximately the tension upon the trolling line in the water, thus the sensitiveness of the spring adjustment, when the line is extended, will cause the reel to respond instantly and yield line just enough when a strike is registered to set the hook firmly in the mouth of the fish without snagging the cartilage thereof. Upon the strike of the fish, which is followed by its rush, the tension of the spring being now greater than the momentary reduced tension upon the line, due to the rush of the fish, instantly winds up and thus keeps a tight line upon the fish. At this stage of the proceedings, the fisherman throws in the clutch 33 and the hub 18 of the reel is rotated to wind up the trolling line, the speed of rotation being graduated by the variable speed transmission, which the fisherman can manipulate by the control lever 35, which actuates the friction wheel upon the peripheral surfaces of the rotating disk. When the fish has been reeled in, the clutch 33 is disengaged, the adjustment in the tension of the line being constantly maintained by the action of the torsion spring. The fish being removed from the line, the dog engaging element is thrown out and the brake band is applied to permit the line to be returned under control to the water as above described.

While I have illustrated and described my preferred form of construction for carrying into execution the objects and aims of my invention, I am fully cognizant of the fact that various mechanical changes in the details of construction can be made to accomplish the result within the scope of the following claims.

What I claim as new, and desire to protect by Letters Patent, is:—

1. An automatic reeling device for trolling lines in combination with the propeller shaft of a power driven boat, an automatic reel mounted for axial rotation upon the rear deck of said boat, a variable speed transmission operatively connected with said propeller shaft and adapted to actuate said reel to wind in the trolling line thereof, and means for retarding the unwinding of said reel whereby the trolling line can be returned to the water.

2. An automatic reeling device for trolling lines in combination with the propeller shaft of a motor driven boat, a transverse shaft rotatably mounted upon the deck of said boat, means for actuating said transverse shaft from said propeller shaft, an automatic reel mounted for axial rotation upon said transverse shaft, and means for locking the hub of said reel to said transverse shaft whereby said hub can be rotatably actuated to wind in said trolling line.

3. An automatic reeling device for trolling lines in combination with the propeller shaft of a motor driven boat, a transverse shaft rotatably mounted upon the rear deck of said boat, a friction wheel keyed for longitudinal movement upon said transverse shaft, a friction disk adapted to be operatively connected with said propeller shaft for rotatably actuating said friction wheel, an automatic reel rotatably mounted upon said transverse shaft, and means for locking the hub of said reel to said transverse shaft whereby said hub can be rotatably actuated to wind in said trolling line.

4. An automatic reeling device for trolling lines in combination with the propeller shaft of a motor driven boat, a transverse shaft yieldingly mounted for rotation upon the rear deck of said boat, a variable speed transmission operatively connected to said propeller shaft for rotatably actuating said transverse shaft, an automatic reel mounted for axial rotation upon said transverse shaft, a clutch keyed for longitudinal movement upon said transverse shaft and adapted to engage the hub of said reel to effect rotation thereof, and means engageable with said reel for retarding the unwinding thereof whereby said trolling line can be returned to the water.

5. An automatic reeling device for trolling lines in combination with the propeller shaft of a motor driven boat, a transverse shaft rotatably mounted upon the rear deck of said boat, a variable speed transmission operatively connected with said propeller shaft for rotatably actuating said transverse shaft, an automatic reel mounted for axial rotation upon said transverse shaft, a clutch keyed for longitudinal movement upon said transverse shaft and adapted to engage the hub of said reel to effect rotation thereof, means engageable with said hub independently of said transverse shaft to preclude reverse rotation of said hub, and means engageable with said reel for retarding the unwinding thereof whereby said trolling line can be returned to the water.

Signed by me at Seattle, Washington, this 5th day of March, 1918.

THOMAS J. TREW.

Witnesses:
R. J. COOK,
D. C. KUHNS.